Sept. 9, 1941.  W. L. McGRATH  2,255,735
AIR CONDITIONING SYSTEM
Filed Nov. 2, 1939
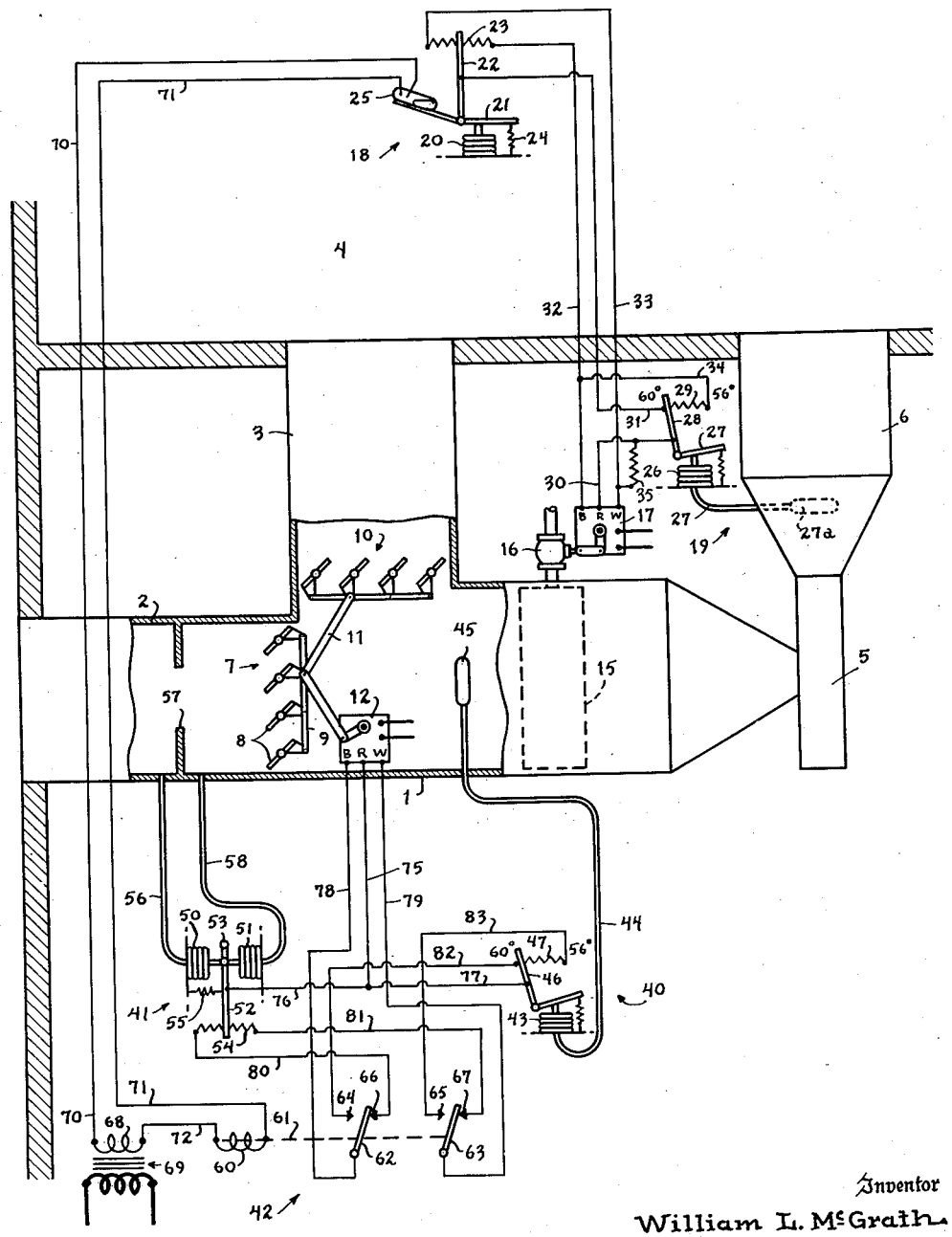
Inventor
William L. McGrath
By George H. Fisher
Attorney Patented Sept. 9, 1941

2,255,735

UNITED STATES PATENT OFFICE 2,255,735

AIR CONDITIONING SYSTEM

William L. McGrath, St. Paul, Minn., assignor to Minneapolis-Honeywell Regulator Company, Minneapolis, Minn., a corporation of Delaware Application November 2, 1939, Serial No. 302,571

10 Claims. (Cl. 236—38)

This invention relates to an air conditioning system and is particularly concerned with a system wherein a controllable amount of fresh air is delivered to a space after being properly conditioned.

It is common practice to deliver a mixture of fresh and return air to a space after passing through a conditioning chamber, and in the interests of economy, it is advisable to decrease the amount of fresh air to a minimum when conditions are such that the condition of the fresh air does not aid in maintaining the desired condition of the air in the space. In such case, it would be most economical to shut off the supply of fresh air entirely, but local regulations often require that there shall always be at least a minimum amount of fresh air admitted to the space, particularly in the case of schools, theaters, public auditoriums and the like, for purposes of ventilation. The supply of fresh air is generally controlled by a damper in the fresh air inlet, and in order that some fresh air be admitted to the system at all times, the control system is arranged so that the thermostat or other device in control of the damper cannot cause the damper to close completely.

Conventional arrangements of this type have a definite disadvantage which my invention overcomes. In the conventional arrangement, when the damper moves to its minimum position, reducing the area of the fresh air inlet to a fixed minimum value, there is no assurance that the quantity of fresh air admitted will be maintained at a constant predetermined value. In fact, the quantity of fresh air admitted through the fresh air inlet of fixed area will vary in accordance with wind velocity, wind direction, etc. Accordingly, at certain times, the amount of fresh air admitted may drop far below the value which is considered desirable, whereas at other times the amount of fresh air may increase considerably above the minimum desired value, with the result that an unnecessarily large quantity of fresh air is admitted to the system, resulting in an increase in the expense of operation, which my invention aims to avoid.

In accordance with my invention, when conditions are such that a minimum quantity of fresh air is to be admitted to the system, the fresh air damper is not moved to a predetermined fixed position, but is placed under the control of a flow controller so that a minimum predetermined quantity of fresh air will be admitted to the system regardless of wind velocity and direction and any other condition that might affect the rate of flow through the inlet, the damper position varying in accordance with changes in such conditions in such a manner that the flow of air through the inlet remains at a fixed value. In this manner, assurance is had that the quantity of fresh air will not drop below the desired value at any time, and that it will not increase above a desired value with the resultant unnecessary increase in the expense of operation of the system.

It is accordingly an object of the present invention to provide, in an air conditioning system of the type set forth above, a fresh air damper controlling means whereby, when it is desired to supply a minimum amount of fresh air to the system, the fresh air damper will be positioned so that the amount of fresh air supplied will be maintained at a constant predetermined value at all times, regardless of outdoor wind velocity, wind direction, etc.

Other objects and advantages will become apparent upon a study of the specification, claims, and appended drawing, wherein is illustrated schematically one form of air conditioning system embodying the principles of my invention.

Referring to the drawing reference character 1 indicates an air conditioning or heating chamber which is provided with a fresh air inlet duct 2 and a return air inlet duct 3, this duct leading from a space 4. The chamber 1 is also connected to a fan 5 which in turn is connected to a discharge duct 6 for conveying heated air to the space 4. Located in the fresh air duct 2 is a fresh air damper 7 which may be formed in the usual manner consisting of a plurality of blades 8 connected together by a link 9. The return air duct 3 is provided with a similar return air damper 10 this damper being cross-connected with the damper 7 by means of a cross-connection 11 which causes these dampers to operate in unison but in opposite manners. The dampers 7 and 10 are actuated by means of a proportioning motor 12, this motor acting upon movement in one direction to open the fresh air damper and close the return air damper, and acting upon movement in the opposite direction to close the fresh air damper and open the return air damper.

The heating chamber 1 contains a heating coil 15, this coil being provided with a valve 16 for controlling the flow of heating medium thereto. This valve 16 is actuated by means of a proportioning motor 17 and this motor is shown as being controlled by a space thermostat 18 and a low limit discharge thermostat 19.

The space thermostat 18 is of the potentiometer type and is diagrammatically illustrated as comprising a bellows 20 which responds to room temperature, this bellows actuating a bell crank lever consisting of an actuating arm 21 and a control arm or slider 22 which cooperates with a resistance 23 to form a control potentiometer for the motor 17. Upon rise in space temperature the bellows 20 will expand against the action of an adjustable biasing spring 24 thus causing the slider 22 to move to the left across resistance 23. Upon fall in room temperature the slider 22 will move in the opposite direction. The room thermostat 18 also may include an auxiliary switching mechanism which is diagrammatically illustrated as consisting of a mercury switch 25 which is also actuated by the bellows 20. This switching mechanism is arranged to close when the slider 22 engages the left hand end of the resistance 23 while remaining open so long as the slider 22 is out of engagement with said left hand end of the resistance.

The low limit controller 19 may be of usual form and is shown as including a bellows 26 which is connected by a capillary tube 27 to a control bulb 27a located in the discharge duct 6. The bellows 26 actuates a bell crank lever including an actuating arm 27 and a control arm or slider 28 which cooperates with a resistance 29. This instrument may be designed and adjusted so that the slider 28 engages the left hand end of resistance 29 (as shown) when the discharge temperature is at or above 60° F. while engaging the right hand end of said resistance when the discharge temperature falls to a lower value such as 56° F.

The proportioning motor 17 may be of the type shown and described in the Taylor Patent 2,028,110. Upon reference to this patent it will be noted that the motor 17 is provided with a three-wire control circuit including wires which are marked R, W, and B in the drawing. This motor is adapted to assume intermediate positions depending upon the relative values of resistance which are connected between terminals R and B and between terminals R and W. This motor thus is adapted for control by a potentiometer type of controller and will assume intermediate positions depending upon the position of the potentiometer slider upon its resistance. Referring to the wiring it will be noted that terminal R of motor 17 is connected by wire 30 to the slider 28 of low limit controller 19 and that the left hand end of resistance 29 is connected by wire 31 to the slider 22 of the room thermostat 18. Thus when the discharge temperature is at or above 60° F. terminal R of motor 17 is directly connected to the slider 22 of thermostat 18. Terminal B of motor 17 is connected by wire 32 to the right hand end of resistance 23 and terminal W of motor 17 is connected to the left hand end of resistance 23 by wire 33. It will be apparent that as long as the slider 28 of thermostat 19 engages the left hand end of resistance 29 thus connecting terminal R of motor 17 to the slider 22 of thermostat 18, the thermostat 18 will control the position assumed by the motor 17 and hence the position of the valve 16. Thus if the space temperature rises, the thermostat 18 will cause operation of the motor 17 for closing partially the valve 16 and upon fall in space temperature the motor 17 will operate for increasing the opening of said valve. In the event that the thermostat 18 attempts to close the valve 16 to such an extent that the discharge temperature begins falling below 60° F. the slider 28 of thermostat 19 will begin moving to the right along resistance 29. This will place a portion of the resistance 29 into circuit with the slider 22 of thermostat 18 thereby decreasing the effect of the thermostat 18 upon motor 17. Also as the right hand end of resistance 29 is connected to terminal B of motor 17 by wires 34 and 32, the movement of slider 28 along resistance 29 will decrease the amount of said resistance which is connected between terminals R and B of motor 17 which will cause motor 17 to begin opening valve 16 for thus preventing the discharge temperature from falling too low. From the description thus far it will be apparent that the thermostat 18 normally controls the valve 16 and that the low limit controller 19 serves to prevent the temperature of the air being discharged into the space from falling below the desired value. The resistance 35 which is connected between wires 30 and 33 is provided for balancing the control circuit and should be equal to the resistance 29.

The damper motor 12 is controlled by means of a mixture thermostat 40, a flow responsive controller 41, and by a relay 42 which is controlled by the switch 25 on thermostat 18. Referring to the mixture thermostat 40 this thermostat may be of usual form including a bellows 43 which is connected by a capillary tube 44 to a control bulb 45 which is located in chamber 1 so as to be responsive to the temperature of the mixture of fresh and return air. The bellows 43 actuates a slider 46 which cooperates with a resistance 47 for forming a control potentiometer for the motor 12. Upon fall in temperature, the bellows 43 contracts for causing slider 46 to shift to the right across to resistance 47 and upon increase in mixture temperature, opposite movement of the slider 46 occurs. This instrument may be designed and adjusted so that the slider 46 engages the left hand end of resistance 47 when the mixture temperature is at 60° F. or above while engaging the left hand end of resistance 47 when the mixture temperature falls to a lower value such as 56° F.

The flow controller 41 may consist of a pair of opposed bellows 50 and 51 which actuate a slider 52 which is pivoted at 53. The slider 52 cooperates with a resistance 54 to form a control potentiometer for motor 12. This slider is also biased by means of a spring 55 which tends to contract the bellows 50 and expand the bellows 51. The bellows 50 is connected by a tube 56 to the fresh air duct 2 upon the inlet side of a restricted opening 57 in said duct. The bellows 51 is connected by a tube 58 to the outlet side of said opening. The difference in pressure existing in the bellows 50 and 51 is therefore equal to the drop in pressure of the fresh air flowing through the restricted opening 57. The degree of drop in pressure of the air flowing through this restricted opening is an indication of the rate of flow of the air. As the air flow increases the pressure drop across opening 57 will increase which results in the pressure within bellows 51 decreasing. This permits the bellows 50 to move the slider 52 to the right across resistance 54 against the action of the biasing spring 55. Conversely upon decrease in air flow through the duct 2, the pressure drop across opening 57 will decrease thereby causing the pressure in bellows 51 to increase for moving the slider 52 to the left across resistance 54.

The relay 42 is of usual form consisting of a pull-in coil 60 which actuates through an armature 61, switch arms 62 and 63 which cooperate respectively with "in" contacts 64 and 65, and with "out" contacts 66 and 67. When the coil 60 is energized, the switch arms 62 and 63 will engage their "in" contacts while when this coil is deenergized the switch arms will engage their "out" contacts. The coil 60 is controlled by the switch 25 on thermostat 18. Thus when this switch 25 is closed, a circuit will be completed from the secondary 68 of transformer 69 through wire 70, switch 25, wire 71, coil 60, and wire 72 to secondary 68. However, as long as the switch 25 is open as shown, the relay 42 will remain deenergized which causes the switch arms 62 and 63 to engage the "out" contacts. Referring to the wiring between the motor 12 and its controls, it will be noted that terminal R of this motor is connected by wires 75, 76, and 77 to the sliders 52 and 46 of controllers 41 and 40, respectively. Terminal B of motor 12 is connected by wire 78 to the switch arm 62 of relay 42, and terminal W of said motor is connected by wire 79 to the switch arm 63 of the relay. The left hand end of resistance 54 is connected by wire 80 to the "out" contact 66 while the right hand end of this resistance is connected by wire 81 to the "out" contact 67. Similarly the left hand end of resistance 47 of thermostat 40 is connected by wire 82 to the "in" contact 64 of relay 42 and the right hand end of said resistance is connected by wire 83 to the "in" contact 65.

When the relay 42 is deenergized, as shown, the switch arms 62 and 63 engage contacts 66 and 67 which connects the right hand of resistance 54 to terminal W of motor 12, and connects terminal B of said motor to the left hand end of resistance 54. At this time the resistance 47 of thermostat 40 is completely disconnected from the motor 12. Therefore as long as the relay 42 is deenergized, the flow controller 41 will be in complete control of the damper motor 12. The controller 41 is adjusted either by varying the tension of spring 55 or in any suitable manner so as to maintain the flow of fresh air at the desired minimum value. If the flow of fresh air begins rising above this value, the pressure drop across opening 57 will increase thus causing movement of slider 52 to the right across resistance 54. The proportioning motor 12 will follow up this movement of the slider 52 upon resistance 54 in a direction for closing the fresh air damper 7 and opening the return air damper 10 thereby counteracting the tendency of the flow of fresh air to increase. Conversely upon decrease in flow of fresh air, the slider 52 will move to the left across resistance 54 which movement will be followed up by motor 12 for increasing the flow of fresh air and decreasing the flow of return air. It will now be apparent that when relay 42 is deenergized, as shown, the flow controller 41 will control the position of the dampers 7 and 10 in a manner for maintaining the flow of fresh air at the desired minimum value. This action of positioning the dampers in whatever position is necessary for obtaining the desired flow completely eliminates the effect of changes in wind direction and velocity upon the flow of fresh air into the building.

When the relay 42 is energized it will completely disconnect the resistance 54 of the flow controller 41 from the damper motor 12 and will instead cause the resistance 47 of the mixture thermostat to be connected to the motor. The mixture thermostat 40 will therefore position the dampers 7 and 10 in a manner for maintaining the constant temperature of the mixture of fresh and return air. Thus if the mixture temperature should decrease, the slider 46 of thermostat 40 will move to the right across resistance 47 and this movement of slider 46 will be followed up by a motor 12 in a direction for decreasing the flow of fresh air and increasing the flow of return air. This will result in counteracting the tendency of the mixture temperature to decrease Upon increase in the mixture temperature the thermostat 40 will cause the motor 12 to be positioned for increasing the flow of fresh air and decreasing the flow of return air.

Referring now to the operation of the system as a whole, under normal conditions space temperature will be within the operating differential thermostat 18 and consequently the switch 25 of said thermostat will be opened. This will cause the relay 42 to be deenergized which places the flow controller 41 in control of the damper motor 12 and this controller will act to position the damper motor so as to supply the desired flow of fresh air, irrespective of wind direction or velocity. At this time the potentiometer of thermostat 18 will control the position assumed by the valve 16 for causing the space temperature to remain substantially constant. During mild weather when only a slight amount of heating or no heat is necessary the thermostat 18 would tend to close valve 16 completely which might tend to cause the temperature of the discharged air to fall below the control point of the discharge controller 19. If this should happen this low limit controller 19 will begin reopening valve 16 for preventing the discharge temperature from falling below the desired value.

In the event that the space temperature should rise above the setting of thermostat 18 due to either mild weather or to other causes, the switch 25 of thermostat 18 will close for energizing relay 42. This will place the damper motor 12 under the control of the discharge thermostat 45 and this thermostat will now position the dampers 7 and 10 to admit whatever amount of fresh air is necessary for lowering the mixture temperature to the desired value. This mixture thermostat it will be noted serves to prevent the temperature of the mixture from falling below the setting of the low limit thermostat 19 and therefore the thermostat 19 will not cause opening of the valve 16 at this time.

From the foregoing description it will be apparent that this invention provides for control of the heating system and also for control of the fresh air damper in a manner to maintain the space temperature at the desired value. It will also be apparent that the present invention provides for variably positioning the fresh air damper to provide whatever winter cooling is necessary, and when no winter cooling is necessary reduces the flow of fresh air to a predetermined minimum value. Due to the use of the flow controller for controlling this minimum flow of fresh air, the proper amount of air for ventilation purposes will be provided irrespective of wind direction and velocity. This arrangement thus insures that the required air for ventilation will always be supplied and also insures that no more air than is necessary for ventilation will be supplied when cooling is not required, thereby avoiding any heating of unnecessary fresh air.

While I have shown and described a single form of this invention it will be apparent that many changes may be made which are within the scope of the invention. For example, while I have shown a mixture thermostat for controlling the fresh air damper position, the damper may be controlled in other manners such for example as a space thermostat, an outside thermostat, dew-point thermostat and in some cases by a humidity controller. While the flow controller is shown as responding to the flow of fresh air, it will be apparent that similar results can be obtained by arranging the controller to respond to the flow of return air in cases where a constant volume of air is circulated. Inasmuch as the invention may be modified in many different manners it is desired to be limited only by the scope of the appended claims.

I claim as my invention:

1. In an air conditioning system for conditioning the air in a space, an air conditioning chamber, means for circulating air through said chamber and the space to be conditioned, said chamber including a fresh air inlet through which outside air may be admitted and an inlet for the admission of return air from said space, damper means controlling the flow of air through said fresh air inlet into said chamber, and means responsive to the rate of flow of air through said fresh air inlet in control of said damper means to maintain a uniform rate of flow through said fresh air inlet.

2. In an air conditioning system for conditioning the air in a space, an air conditioning chamber, means for circulating air through said chamber and the space to be conditioned, said chamber including a fresh air inlet through which outside air may be admitted and an inlet for the admission of return air from said space, damper means controlling the flow of air through said fresh air inlet into said chamber, a restriction between said damper means and the fresh air inlet through which the air entering said chamber by way of the fresh air inlet must pass, and means responsive to the drop in pressure through said restriction for controlling said damper means to maintain a constant rate of flow into said chamber by way of the fresh air inlet.

3. In an air conditioning system for conditioning the air in a space, an air conditioning chamber, means for circulating air through said chamber and the space to be conditioned, said chamber including a fresh air inlet through which outside air may be admitted and an inlet for the admission of return air from said space, damper means controlling the flow of air through said fresh air inlet into said chamber, conditioning means in said conditioning chamber, space condition responsive means in control of said conditioning means, means responsive to the rate of flow of air through said fresh air inlet adapted to control said damper means to maintain a uniform minimum rate of flow through said fresh air inlet, and means for placing said damper means solely under the control of said flow responsive means when the condition in the space is such as to require operation of said conditioning means.

4. In an air conditioning system for conditioning the air in a space, an air conditioning chamber, means for circulating air through said chamber and the space to be conditioned, said chamber including a fresh air inlet through which outside air may be admitted and an inlet for the admission of return air from said space, damper means controlling the flow of air through said fresh air inlet into said chamber, conditioning means in said conditioning chamber, space condition responsive means in control of said conditioning means, means responsive to the rate of flow of air through said fresh air inlet adapted to control said damper means to maintain a uniform minimum rate of flow through said fresh air inlet, means for placing said damper means solely under the control of said flow responsive means when the condition in the space is such as to require operation of said conditioning means, means responsive to the condition of the mixture of fresh and return air adapted to control the position of said damper means, and means for placing said damper means solely under the control of said last responsive means when the condition of the space is such as to render unnecessary the operation of said conditioning means.

5. In an air conditioning system for conditioning the air in a space, an air conditioning chamber, means for circulating air through said chamber and the space to be conditioned, said chamber including a fresh air inlet through which outside air may be admitted and an inlet for the admission of return air from said space, damper means controlling the flow of air through said fresh air inlet into said chamber, conditioning means in said conditioning chamber, space condition responsive means in control of said conditioning means, control means for said damper means, said control means including a first means responsive to the rate of flow of air through said fresh air inlet and a second means responsive to a condition of the mixture of air entering said chamber through said fresh and return air inlets, and means responsive to the condition of the air in said space for placing said damper means under the control of said first means or said second means.

6. In a system of the class described, in combination, an air conditioning chamber, means for circulating air through said chamber to a space to be conditioned, said chamber having inlets for fresh air and for air recirculating from said space, damper means for controlling the flow of fresh air into said chamber, a condition responsive means adapted to position said damper means in accordance with the value of the condition to which said condition responsive means responds thereby to vary the proportions of fresh and recirculated air in accordance with the value of said condition, a minimum flow controller for also controlling said damper means, said minimum flow controller responding to the flow of fresh air and adapted to position said damper means in a manner to maintain a predetermined minimum flow of fresh air, and means to place selectively said damper means under the control of either said condition responsive means or said minimum flow controller.

7. In a system of the class described, in combination, an air conditioning chamber, means for circulating air through said chamber to a space to be conditioned, said chamber having inlets for fresh air and for air recirculating from said space, damper means for controlling the flow of fresh air into said chamber, a damper motor adapted to position said damper means, said damper motor having control line means, a first condition responsive means connected to said control line means for positioning said damper means in accordance with the value of the condition to which said condition responsive means responds for thereby to vary the proportions of fresh and recirculated air in accordance with the value of said condition, and a minimum position controller also connected to the control line means for said damper motor, said minimum flow controller responding to the flow of fresh air and adapted to position said damper means in a manner to maintain a predetermined minimum flow of fresh air, and means to place selectively said damper means under the control of either said condition responsive means or said minimum flow controller.

8. In an air conditioning system for conditioning the air in a space, an air conditioning chamber, heating means in said air conditioning chamber, means for circulating air through said chamber, past said heating means, and through the space to be conditioned, said chamber including a fresh air inlet through which outside air may be admitted and an inlet for the admission of return air from the space, damper means controlling the flow of air into said chamber by way of the fresh air inlet, means responsive to the temperature of the space in control of said heating means, means responsive to the rate of flow of air through said fresh air inlet for positioning the damper means to maintain a uniform small rate of flow of air through said fresh air inlet, and means for placing the damper means under the control of said flow responsive means when the temperature of the space drops sufficiently to require operation of said heating means.

9. In an air conditioning system for conditioning the air in a space, an air conditioning chamber, heating means in said air conditioning chamber, means for circulating air through said chamber, past said heating means, and through the space to be conditioned, said chamber including a fresh air inlet through which outside air may be admitted and an inlet for the admission of return air from the space, damper means controlling the flow of air into said chamber by way of the fresh air inlet, means responsive to the temperature of the space in control of said heating means, means responsive to the rate of flow of air through said fresh air inlet for positioning the damper means to maintain a uniform small rate of flow of air through said fresh air inlet, a second means responsive to the temperature of the mixture of fresh and return air entering the chamber in control of said damper means, and means responsive to the temperature of the space for placing the damper means under the control of the flow responsive means when the space temperature is below a predetermined value and for placing the damper means under the control of the mixture temperature responsive means when the space temperature is above a predetermined value.

10. In an air conditioning system for conditioning the air in a space, an air conditioning chamber, heating means in said air conditioning chamber, means for circulating air through said chamber, past said heating means, and through the space to be conditioned, means responsive to the space temperature for controlling said heating means to maintain the space temperature within a desired range, said chamber including a fresh air inlet through which outside air may be admitted, and an inlet for the admission of return air from the space, damper means controlling the flow of air into said chamber by way of the fresh air inlet, means responsive to the rate of flow of air through said fresh air inlet for controlling the position of said damper means to maintain a small rate of flow through said fresh air inlet, and means controlled by said space temperature responsive means for interrupting the control of said damper means by said last named means when the space temperature rises above said range so as to permit said damper means to maintain a larger rate of flow through said fresh air inlet.

WILLIAM L. McGRATH.